J. M. McCOOL.
SHOCK ABSORBER.
APPLICATION FILED JAN. 24, 1916. RENEWED NOV. 18, 1916.
1,230,496.
Patented June 19, 1917.
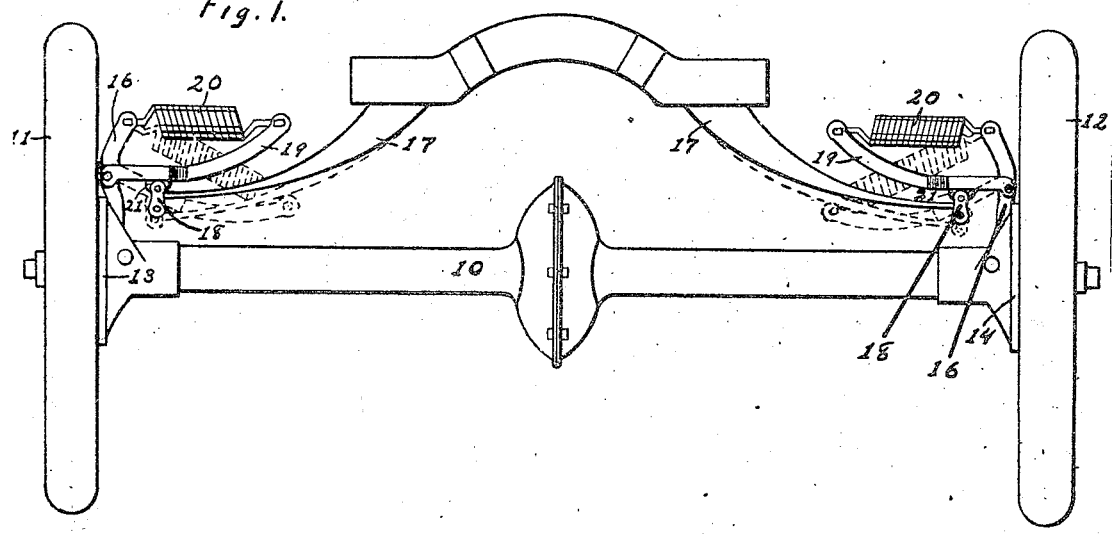
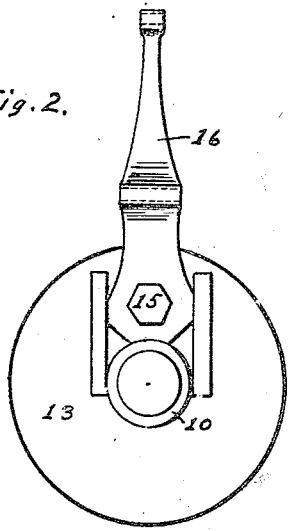
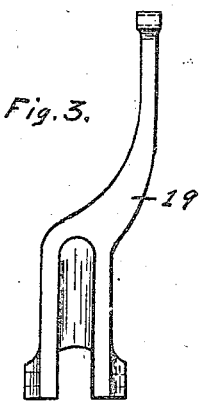
Witnesses.
W. H. Collins.
W. S. Houghton
Inventor.
Joseph M. McCool.
By Earl M. Sinclair
Atty.

UNITED STATES PATENT OFFICE.

JOSEPH M. McCOOL, OF DES MOINES, IOWA, ASSIGNOR TO HUGH BRENNAN, OF DES MOINES, IOWA.

SHOCK-ABSORBER.

1,230,496.          Specification of Letters Patent.        Patented June 19, 1917.

Application filed January 24, 1916, Serial No. 74,017. Renewed November 18, 1916. Serial No. 132,234.

*To all whom it may concern:*

Be it known that I, JOSEPH M. McCOOL, citizen of the United States of America, and resident of Des Moines, Polk county, Iowa, have invented a new and useful Shock-Absorber, of which the following is a specification.

The object of this invention is to provide an improved construction for shock absorbers for motor vehicles and especially designed for use on "Ford" automobiles.

A further object of this invention is to provide improved shock absorbing mechanism for suspending a car body from a support such as an axle.

My invention consists in the construction, arrangement and combination of elements hereinafter set forth, pointed out in my claims and illustrated by the accompanying drawing, in which—

Figure 1 is a rear elevation illustrating a portion of the rear running gear of a vehicle equipped with my improved device. Fig. 2 is an inner face view of a supporting bracket mounted in position on the running gear. Fig. 3 is a plan of one of the levers detached. Figs. 2 and 3 are on a scale enlarged relative to Fig. 1.

In the construction and mounting of the device as shown the numeral 10 designates generally the rear axle of a motor vehicle of common and well known construction, said axle being supported by wheels 11, 12. In connection with the axle 10 are the brake housings 13, 14. Secured to the inner face of each of the brake housings 13, 14, by means of bolts 15, one of which is shown in Fig. 2, is an elongated supporting bracket 16, which takes the place of the common perch to which the ends of the rear spring 17 is secured by the shackles or links 18. In my construction, however, the spring shackles are not connected to the supporting brackets, but are suspended from the shock absorber levers as hereinafter set forth. Each supporting bracket 16 is curved inwardly at its upper end away from the adjacent wheel 11 or 12, and is apertured at its upper end. The supporting brackets 16 also are apertured intermediate of their ends, and to each of said brackets is pivoted the outer end of a lever 19. The levers 19 extend inwardly toward the median line of the vehicle and are curved upwardly in their inner portions, so that their inner ends, which also are apertured, are normally in approximately the same horizontal plane as the upper ends of the supporting brackets 16. A relatively stiff retractile coil spring 20 yieldingly connects the upper or inner arm of each lever 19 to its respective supporting bracket 16, by means of the apertures in the ends of said members, through which the ends of the spring are hooked. An ear 21 is formed on and projects downwardly from the lower side of each lever 19 and spaced from the pivoted outer end thereof, and to said ears the opposite ends of the vehicle spring 17 are connected by the shackles or links 18, so that the said spring, and the weight which it carries, is suspended from said levers. The levers 19 also are curved, bent or offset forwardly in their inner portions, as shown in Fig. 3, so that the inner ends of said members lie in vertical planes forward of the planes of the spring 17.

In practical use any downward movement of the vehicle body is communicated through the springs 17 to the levers 19, at the points of attachment of said springs through the links 18. This causes a downward movement of the inner ends of the levers 19, against the tension of the springs 20, supported by the brackets 16. The springs 20 thus take the shock of the vertical movements of the vehicle body, and tend to return the parts to their normal positions without rebounding effect. Side-sway of the vehicle body is also overcome to a large extent, thus eliminating one of the objections to many of the common forms of shock absorbers which include vertically arranged springs. The inner ends of the levers 19, because of the offset therein, may pass the ends of the springs 17, as indicated by dotted lines in Fig. 1.

By arranging the coil springs above and the links below the fulcrums of the levers and having said springs wholly independent of the car body, the shock and jar is removed from rather than reacted upon said car body.

It is to be understood, of course, that similar devices may be applied to the forward running gears of the vehicle, by such modifications of the supporting bracket and its location as will readily be suggested to the mechanic skilled in and familiar with such devices.

It will be noted that the spaced brackets carried by the axle, the levers fulcrumed on intermediate portions of said brackets, and the elastic connections 20 between said levers and brackets, with the body spring 17 connected to and suspended from said levers intermediate of the fulcrums and points of application of the elastic connections, provides a shock absorbing suspension for the car body which is wholly self-contained and not connected with the car body in any manner except through said body spring, thereby eliminating pull and side sway of the car body.

I do not desire to be understood as limiting myself to the precise construction and arrangement of parts herein shown and described, as various modifications thereof may be employed without departing from the spirit of my invention.

I claim as my invention—

1. A device of the class described, comprising a support, brackets rising from opposite ends thereof, levers pivoted at their outer ends to said brackets, pivotal connections between intermediate portions of said levers and a car body, said pivotal connection being wholly below the fulcrums of the levers, and retractile springs connecting the upper ends of said brackets to the inner ends of said levers.

2. A device of the class described, comprising a support, brackets rising from opposite ends thereof, levers pivoted at their outer ends to said brackets, said levers being curved upwardly at their inner ends, pivotal connections between intermediate portions of said levers and a car body, and retractile springs yieldingly connecting the inner ends of said levers to the upper ends of the adjacent brackets above the levers, said springs being wholly independent of the car body.

3. A device of the class described, comprising a support, brackets fixed to and rising from opposite ends thereof, said brackets being curved inwardly at their upper ends, levers pivoted at their outer ends to intermediate portions of said brackets, pivotal connections between intermediate portions of said levers and a car body, said car body being wholly independent of said brackets, and retractile coil springs yieldingly connecting the inner ends of said levers to the upper ends of the adjacent brackets.

4. A device of the class described, comprising a support, brackets fixed to and rising from said support and spaced apart, the upper end portions of said brackets inclining inwardly, levers pivoted to and below the upper ends of said brackets, the inner end portions of said levers inclining to the horizontal plane of the upper ends of said brackets, retractile coil springs connecting the upper ends of said levers to the inner upper ends of said brackets, together with means for suspending a device pivotally from intermediate portions of said levers, wholly independent of said brackets.

5. A device of the class described, comprising a support, spaced brackets fixed to and rising from said support, rigid levers pivoted at one end each to and below the upper ends of said brackets, yielding pressure devices yieldingly connecting the inner ends of said levers to the upper ends of said brackets, links pivoted to and depending from intermediate portions of said levers, and a device connected to the lower ends of and supported by said links, which device is wholly independent of said brackets.

6. A device of the class described, comprising a support, spaced brackets fixed to and rising therefrom, unyielding levers pivoted at one end each to and below the upper ends of said brackets, yielding pressure devices yieldingly connecting the inner ends of said levers to the upper ends of said brackets, links pivoted to and depending from intermediate portions of said levers, and a device connected to the lower ends of and supported by said links, said levers being offset at their inner ends out of the plane of said device, which device is wholly independent of said brackets.

7. A device of the class described, comprising a support, brackets rising from opposite ends thereof, levers pivoted at their outer ends to said brackets, connections between intermediate portions of said levers and a car body, and elastic connections between said brackets and the levers.

8. A device of the class described, comprising a support, brackets rising from opposite ends thereof, levers pivoted at their outer ends to said brackets, means for carrying a car body on intermediate portions of said levers, and elastic connections between said brackets and the levers.

9. Shock absorbing means adapted to carry a car body from a support such as an axle, said means comprising spaced carriers mounted on said support, levers fulcrumed on said carriers, suspending connections carried by said levers and adapted in turn to carry the car body, and yielding pressure devices susceptible of operation in the same general direction as the suspending connections, which yielding pressure devices connect the carriers and levers.

10. Shock absorbing means adapted to carry a car body from a support such as an axle, said means comprising brackets carried by said support in spaced relations, levers fulcrumed on intermediate portions of said brackets, elastic connections between extremities of said levers and brackets, and suspending connections adapted to be interposed between said car body and levers, the points of application of said suspending connections to the levers being intermediate of the fulcrums and points of application of the elastic connections.

11. A device of the class described, comprising a support, brackets mounted on said support in spaced relations, levers pivoted at their outer ends on said brackets, means for carrying a car body on intermediate portions of said levers, and elastic connections between said levers and the brackets, said elastic connections being wholly independent of the car body.

12. A device of the class described, comprising a support, brackets mounted on said support in spaced relations, levers fulcrumed at their outer ends on said brackets, said levers being curved upwardly at their inner ends, means for suspending a car body from intermediate portions of said levers, and elastic connections between inner ends of said levers and upper ends of said brackets, said elastic connections being wholly independent of said car body, said car body being wholly independent of said brackets.

Signed by me at Des Moines, Iowa, in the presence of two witnesses.

JOSEPH M. McCOOL.

Witnesses:
 EARL M. SINCLAIR,
 R. B. DENNIS.